United States Patent [19]

Leckie

[11] 4,275,693
[45] Jun. 30, 1981

[54] FUEL INJECTION TIMING AND CONTROL APPARATUS

[76] Inventor: William H. Leckie, 3 Hickory Hollow, Birmingham, Mich. 48010

[21] Appl. No.: 93,172

[22] Filed: Nov. 13, 1979

Related U.S. Application Data

[63] Continuation of Ser. No. 862,739, Dec. 21, 1977, abandoned.

[51] Int. Cl.³ .................................................. F02M 51/06
[52] U.S. Cl. ................................. 123/447; 123/472; 239/89; 239/585
[58] Field of Search ....... 123/139 AS, 139 E, 32 EA, 123/32 EL, 139 AK; 239/585, 88, 89

[56] References Cited

U.S. PATENT DOCUMENTS

| | | | |
|---|---|---|---|
| 2,501,074 | 3/1950 | Meitzler | 239/88 X |
| 2,530,128 | 11/1950 | Mashinter | 123/139 AK X |
| 3,053,463 | 9/1962 | De Milleville | 239/585 X |
| 3,456,628 | 7/1969 | Bassot et al. | 123/32 EA |
| 3,596,640 | 8/1971 | Bloomfield | 123/32 EL |
| 3,800,749 | 4/1974 | Advenier | 123/32 E X |
| 3,827,409 | 8/1974 | O'Neill | 123/32 EA |
| 3,913,537 | 10/1975 | Ziesche et al. | 123/139 E X |
| 3,942,485 | 3/1976 | Suda et al. | 123/32 EA X |
| 4,129,253 | 12/1978 | Bader, Jr. et al. | 123/139 E X |
| 4,129,254 | 12/1978 | Bader, Jr. et al. | 123/139 E X |
| 4,129,255 | 12/1978 | Bader, Jr. et al. | 123/139 E X |
| 4,129,256 | 12/1978 | Bader, Jr. et al. | 123/139 E X |
| 4,217,862 | 8/1980 | Fort et al. | 123/497 X |

*Primary Examiner*—Tony M. Argenbright
*Attorney, Agent, or Firm*—Harness, Dickey & Pierce

[57] ABSTRACT

The disclosure relates to a fuel injector for an internal combustion engine and, more particularly, to a fuel injector for a compression-ignition type engine. The fuel injector precisely meters fuel and accurately times the start and duration of fuel injection in response to an electrical signal that is a composite of a multiplicity of engine and environmental operating parameters as opposed to a fuel pressure threshold.

3 Claims, 2 Drawing Figures

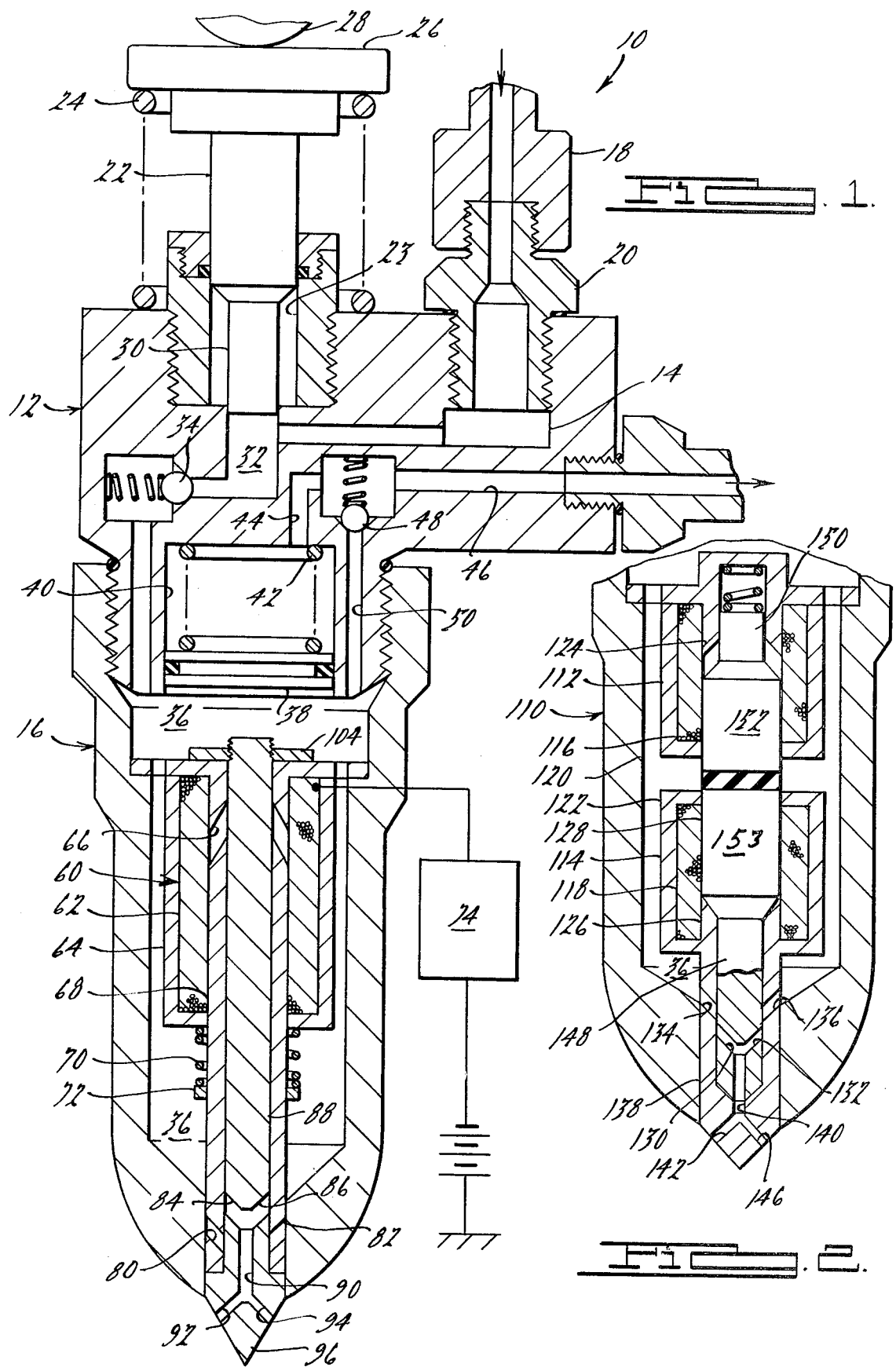

FUEL INJECTION TIMING AND CONTROL APPARATUS

BACKGROUND OF THE INVENTION

This application is a continuation of application Ser. No. 862,739, filed Dec. 21, 1977, now abandoned, for Fuel Injection Timing and Control Apparatus.

Internal combustion engines are subject to variations in power output, smoothness of operation, economy, emissions, etc., incident to variations in fuel-air ratio, unequal distribution of fuel-air mixture to each combustion chamber, the timing of ignition in relation to the position of the piston in the cylinder, acceleration and deceleration transients, the type and amount of fuel provided, as well as external operating parameters, for example, engine load, R.P.M., ambient air pressure and temperature, etc. In addition to the foregoing parameters, compression ignition engines are faced with the functional need for initial injection of fuel during the compression stroke. Accordingly, the high gas pressure developed in the combustion chamber prior to the start of injection inhibits injection requiring fuel to be injected at a relatively higher pressure. High fuel pressure is typically achieved by pumping fuel from a low pressure rotary or gear pump to a high pressure pump. High pressure pumps may utilize rotary, displacement, or other means to pressurize fuel. A typical high pressure pump comprises a positive displacement piston driven by a cam mounted on an engine-driven camshaft. The camshaft is connected by various means, such as gears, chains, rocker-arms, follower assemblies, etc. to the engine crankshaft. Other known means of pressurizing fuel include electrical, mechanical, hydraulic, and electro-mechanical pump systems which separately, or in combination, develop sufficient fuel pressure to open a valve assembly which in turn injects the fuel into the combustion chamber.

Since compression-ignition occurs at a variable point in time subsequent to injection, the efficiency of the pressure-temperature build-up within the combustion chamber during the compression and expansion cycle in relation to crankshaft position and the consequent useful energy output is sensitive to many variables not the least of which is timing and duration of injection. Present compression-ignition engine fuel injection systems typically rely on direct coupling of the timing mechanism controlling fuel injection to the engine crankshaft by means of said gearing, chains, cams etc. In most cases, fuel injection timing is relatively fixed in terms of crankshaft position, notwithstanding that some variation in the timing of fuel injection in terms of crankshaft position can be achieved by mechanical movements or mechanisms which align relief ports or entry ports or both. It is also known to use helical flow paths on the fuel injector plunger shaft which can be rotated to adjustably meter fuel and/or control timing by selective alignment of the fuel entry port and/or fuel relief port. In other prior art devices, mechanical levers or other mechanisms open or close fuel entry or relief ports in response to fuel pressure variations to accomplish fuel injection metering and timing.

While electric modification of pressure actuation of a diesel injector is known, as taught in Bader et al U.S. Pat. Nos. 4,129,254; 4,129,253; 4,129,255 and 4,129,256, there exists a need for a fuel injection system that is capable of precisely controlling and varying the timing and duration of fuel injection, if any, as well as having the capability of precisely metering the proper quantity of fuel, independently of fuel pressure and in response to the totality of internal and external operating conditions solely in response to an electrical signal.

With respect to metering, most known direct injection systems effect filling of a cavity upstream of the injector nozzle with the exact amount of fuel to be injected. The fuel in the cavity is acted upon by a piston to provide the pressure necessary for injection.

In distribution type injectors, either rotary, displacement, or other means are used to pressurize fuel at which time a selector mechanism directs the high pressure fuel to remote injectors at or near each combustion cylinder. The high pressure fuel flows to each injector nozzle causing the nozzle to open and to inject the fuel until a subsequent pressure drop closes the nozzle. Such known systems exhibit delays and inaccuracies related to the remoteness of the pressurizing means and the injection mechanism and are comparatively inefficient for controlling timing and the quantity of fuel injected.

SUMMARY OF THE INVENTION

The fuel injection system of the instant invention is actuated independently of any mechanical connection to the crankshaft. The high pressure fuel pump is not involved in the timing or metering of fuel injection or actuation of the fuel injection nozzle. Fuel injection timing is related to a precise position of each cylinder and variations in the quantity and rate of injection are computed externally from the fuel injection mechanism by various means which include, but are not limited to, electronic, electro-mechanical, electro-magnetic, opto-electronic, piezoelectric, and other temperature, pressure, and position determining sensors, position switches and devices which measure engine operating and environmental parameters. A multiplicity of parameters involved in the combustion process can be accommodated. These include, but are not limited to, crankshaft position, R.P.M., temperature of the ambient air, coolants, fuel, exhaust, and oil, fuel and air pressures, load, engine torque, vehicle speed, transmission and throttle position, fuel-air ratios, combustion pressures, combustion temperatures, combustion air-mass flow and supercharger pressures.

Moreover, it is contemplated that memory devices, such as random-access-memories (RAMS) and/or read-only-memories (ROMS), can be utilized to store either computed data (in the instance of RAMS) or can be programmed (in the instance of ROMS) to reflect changes in injection timing, meter fuel quantity, or rate of flow of metered fuel for a multiplicity of operating conditions. Furthermore, it is contemplated that merely a change in a programmed memory can render a single injection device usable in different engines.

The invention incorporates an accumulator along with its associated pressure relief and other valving which operates to dispense fuel directly to the engine combustion chamber. Thus, the invention provides a means of utilizing very high fuel injection pressures and fuel injecting pressures which can be varied quickly, almost instantaneously, without the delays normally associated with present devices. These features facilitate improvements in fuel economy and engine operating efficiencies and design improvements in injection spray mechanisms as well as shorter periods of fuel injection, not heretofore practical.

More particularly, the armature of an electromechanical solenoid is utilized as a direct fuel injection control device. The armature is not affected by high fuel pressure heads or dynamic shut-off forces. By virtue of its immersion in fuel, it is self lubricating, cooled and dynamically dampened to inhibit undesirable vibration modes.

The armature may utilize electro-magnetic, spring, or other restoring forces. Since the mechanism does not effect pressurization of the fuel, electromagnetic force and speed requirements need only be proportioned to the operating requirements of the engine, for example, in a sophisticated application, to change the rate of opening of the injection orifice, or in its most simple application, to effect only an "open-close" action. In a preferred embodiment of the invention, the electro magnetic solenoid is housed internally of the fuel accumulator of the injector. In another form of the invention, the solenoid may be disposed externally of the pressurized fuel in the accumulator. More than one electro magnetic solenoid may be utilized either to amplify the forces on the armature, eliminate return springs, or to provide opposing forces to the "open" and "close" action. In some applications, more precise movement and/or speed of armature movement can be realized with more than one solenoid. A variable and controllable pressure relief valve is connected to the high pressure accumulator so as to provide for safety, as well as allow variations in fuel quantity metering.

It is to be noted that the fuel injector 10 can either be retrofit to an existing diesel engine or disigned into new equipment. The injector renders the engine susceptible of electronic control of the timing and duration of fuel injection independently of the mechanical limitations of currently utilized injectors. Control and injection of liquid fuel is independent of the pressure of said fuel as distinguished from the prior art which characteristically uses a pressure threshhold to initiate injection.

Applicant's contribution is also to be distinguished from injectors which use an electric solenoid merely to control a pressure relief valve to thereby control pressure response of the injector.

More specifically, Applicant's electric non-fuel pressure responsive fuel injector comprises an injector housing which may be mounted in the position of a conventional pressure excited fuel injector. A fuel accumulator is provided including a spring loaded piston for maintaining the pressure of liquid fuel therein relatively constant incident to changes in the volume of fuel in the accumulator. A fuel pump adapted to be mechanically driven directly by the conventional cam shaft of the engine is provided for pressurizing fuel in the accumulator. A fuel injection nozzle communicates with the accumulator and the combustion chamber of the diesel internal combustion engine. A sleeve valve having radially directed fuel flow control ports communicating with the accumulator and the injection nozzle effects control of the flow of fuel from the accumulator to the injection nozzle. Fuel ports are orientated relative to the direction of opening and closing of the sleeve valve whereby the pressure of fuel thereon or passing therethrough exerts no opening or closing force on the valve. An electric solenoid controls movement of the valve independently of the pressure of the fuel in the accumulator and of the speed of rotation of the engine. Conventional sensors having an electrical output are provided for energizing the solenoid independently of the fuel pump and pressure in the accumulator in response to selected engine and environmental parameters. If, for example, shutdown of one or more cylinders is desired, mere interruption of energization of the solenoid is required. Obviously, complete and instantaneous shutdown on deceleration or braking of a vehicle is possible.

BRIEF DESCRIPTION OF THE DRAWINGS

FIG. 1 is a cross sectional view of an improved fuel injector in accordance with one embodiment of the invention.

FIG. 2 is a cross sectional view, similar to FIG. 1, illustrating a modified embodiment of the present invention utilizing dual solenoids.

DETAILED DESCRIPTION OF THE INVENTION

Referring to FIG. 1 of the drawings, a fuel injector 10 in accordance with the present invention comprises a housing 12 having a manifold 14 and a tubular barrel 16. The manifold 14 has conventional fittings 18 and 20 for the acceptance of relatively low pressure fuel into the manifold 14.

The fuel plunger 22 is slidable in a bore 23. The plunger 22 is biased upwardly, as seen in the drawings, by a plunger spring 24. The plunger 22 has a follower portion 26 that is engageable by a cam 28 on a camshaft (not shown) of an engine (not shown).

The plunger 22 has a piston 30 at the lower end thereof which acts against fuel in a pumping chamber 32 to pressurize and pump the fuel past a check valve 34 into a plenum chamber or accumulator 36 interiorly of the barrel 16.

The manifold 14 is provided with an accumulator piston 38 that is slidably disposed in a bore 40. The piston 38 is movable upwardly against the bias of the spring 42 to maintain fuel pressure relatively constant within the accumulator 36 upon injection of fuel into the working cylinder of an engine as will be described.

The chamber 40 is provided with a relief passage 44 that communicates with an outlet line 46 on the back side of a check valve 48. The accumulator chamber 36 has a relief passage 50 that communicates with the high pressure side of the check valve 48 to relieve pressure within the accumulator 36 above a predetermined level. In this manner, high pressure fuel is constantly flowing through the intake manifold 14, accumulator 36, through outlet line 46, outwardly of the manifold 14 to a fuel reservoir (not shown) to provide an adequate supply of fuel for injection into a working cylinder of an engine as well as to effect cooling of the injector 10.

In accordance with the present invention, injection of fuel under pressure into a working cylinder by the fuel injector 10 is controlled by a solenoid 60 comprising a coil 62, a cylindrical outer casing 64, an inner pole piece 66, and a slidable cylindrical or sleeve-like armature 68. The armature 68 is biased to the normally open condition by a spring 70 which is seated on a radial shoulder 72 on the armature 68.

The solenoid 60 is controlled by a conventional state-of-the art electronic assembly 74, such as but not limited to, suitable sensor transducers, an input-output signal conditioning section, a microprocessor or other suitable electronic processing unit, and a driver section to provide sufficient energy and timing to actuate the solenoid and/or other electro-mechanical device in the conventional manner. The electronic assembly 74 senses and correlates the engine and environmental parameters discussed hereinbefore and translates them into an appropriate electrical signal to the solenoid 60.

The lower end of the armature 68 is provided with a pair of transverse bores 80 and 82 which, when aligned with complementary bores 84 and 86 in a fixed central mandril 88, permit flow of pressurized fuel from the plenum 36 downwardly through a central bore 90 in the mandril 88 and outwardly through discharge passages 92 and 94 in a spray tip 96 of the injector 10. The mandril 88 is non-magnetic to insure magnetic efficiency. A nut 104 secures the coil 62, armature 68 and mandril 88 together as a sub-assembly.

Referring to FIG. 2, a modified injector 110 comprises a pair of opposed solenoids 112 and 114 having coils 116 and 118, cylindrical outer casings 120 and 122, pole pieces 124 and 126, respectively and a common slidable cylindrical armature 128. The armature 128 is biased between the open and closed condition by controlled and/or selective energization of the coils 116 and 118. Thus, control of the injector 110 can be effected by an "on-off" signal or by a "proportional" signal.

The lower end of the armature 128 is provided with a pair of transverse bores 130 and 132 which, when aligned with complementary bores 134 and 136 in a lower tip portion 138 on the housing of the solenoid 114, permit flow of pressurized fuel from the accumulator 36 downwardly through a central bore 140 and outwardly through discharge passages 142 and 146 in the tip 138. A lower end portion 148 and an upper end portion 150 of the armature 128 are non-magnetic while center portions 152 and 153 are magnetizable to maximize the efficiency of the solenoids 120 and 122.

From the foregoing it should be apparent that pressurization of fuel within a plenum chamber of the injector is disassociated from timing and duration of fuel injection which is controlled solely by the energization of a solenoid. In this manner, fuel injection is rendered responsible to a number of parameters of engine performance which heretofore have been incapable of integration into the injector control function.

I claim:

1. An electrically controlled liquid fuel injector for converting a conventional pressure excited fuel injector system of a diesel internal combustion engine to a non-pressure excited injection system, said injector comprising an injector housing adapted to be mounted in the space and position of said conventional pressure excited fuel injector in direct communicating relationship with the combustion chamber of said diesel internal combustion engine, a variable volume fuel accumulator in said housing, said accumulator including means for maintaining the pressure of liquid fuel therein relatively constant incident to changes in the volume of fuel in said accumulator, a fuel pump in said housing comprising a piston adapted to be mechanically driven directly by said engine in direct relation to the speed of rotation thereof for pressurizing fuel in said accumulator, a fuel injection nozzle communicating with said accumulator and the combustion chamber of said diesel internal combustion engine, a fluid flow control valve mechanically and functionally independent from said fuel pump and having fluid flow control ports communicating directly with said accumulator and said injection nozzle for controlling the flow of fuel from said accumulator to said injection nozzle, said valve being movable between an open and closed position independently of the pressure of the fuel in said accumulator, an electric solenoid for controlling movement of said valve independently of the pressure of the fuel in said accumulator, and means for energizing said solenoid independently of said fuel pump and pressure in said accumulator in response to selected engine and environmental parameters.

2. A fuel injection system in accordance with claim 1, wherein said valve comprises a sleeve valve having radially disposed ports.

3. An electric non-fuel pressure responsive fuel injector system for a diesel internal combustion engine comprising an injector housing adapted to be mounted in the space and position of a conventional pressure excited fuel injector in direct communicating relationship with the combustion chamber of said diesel internal combustion engine, a fuel accumulator including means for maintaining the pressure of liquid fuel therein relatively constant incident to changes in the volume of fuel in said accumulator, a fuel pump adapted to be mechanically driven directly by said engine in direct relation to the speed of rotation thereof for pressurizing fuel in said accumulator, a variable volume fuel injection nozzle communicating with said accumulator and the combustion chamber of said diesel internal combustion engine, a sleeve valve having radially directed fuel flow control ports communicating with said accumulator and said injection nozzle for controlling the flow of fuel from said accumulator to said injection nozzle, said fuel ports being orientated relative to the direction of opening and closing of said sleeve valve whereby the pressure of fuel passing therethrough exerts no opening or closing force on said valve, an electric solenoid for controlling movement of said valve independently of the pressure of the fuel in said accumulator and of the speed of rotation of said engine, and means for energizing said solenoid independently of said fuel pump and pressure in said accumulator in response to selected engine and environmental parameters.

* * * * *